(12) United States Patent
Matsui

(10) Patent No.: US 8,599,479 B2
(45) Date of Patent: Dec. 3, 2013

(54) MODULATION CONTRAST MICROSCOPE

(75) Inventor: Kumiko Matsui, Yokohama (JP)

(73) Assignee: Nikon Corporation, Tokyo (JP)

( * ) Notice: Subject to any disclaimer, the term of this patent is extended or adjusted under 35 U.S.C. 154(b) by 436 days.

(21) Appl. No.: 12/743,751

(22) PCT Filed: Nov. 18, 2008

(86) PCT No.: PCT/JP2008/070910
§ 371 (c)(1),
(2), (4) Date: Jun. 9, 2010

(87) PCT Pub. No.: WO2009/066650
PCT Pub. Date: May 28, 2009

(65) Prior Publication Data
US 2010/0284067 A1  Nov. 11, 2010

(30) Foreign Application Priority Data

Nov. 19, 2007  (JP) .................. 2007-299486

(51) Int. Cl.
*G02B 21/00*  (2006.01)
(52) U.S. Cl.
USPC .......................................... 359/370; 359/385
(58) Field of Classification Search
USPC .................................................. 359/385, 370
See application file for complete search history.

(56) References Cited

U.S. PATENT DOCUMENTS

| | | | | |
|---|---|---|---|---|
| 4,200,354 A | * | 4/1980 | Hoffman | 359/370 |
| 6,130,776 A | * | 10/2000 | Takaoka | 359/370 |
| 2003/0030902 A1 | | 2/2003 | Fukushima et al. | |
| 2004/0120029 A1 | | 6/2004 | Krueger | |

FOREIGN PATENT DOCUMENTS

| | | |
|---|---|---|
| DE | 102 45 974 A1 | 4/2004 |
| DE | 103 14 750 A1 | 11/2004 |
| EP | 2 214 045 A1 | 8/2010 |
| JP | A-51-128548 | 11/1976 |
| JP | A-2-35408 | 2/1990 |
| JP | H3-267910 | 11/1991 |
| JP | A-2001-194592 | 7/2001 |
| JP | A-2003-131139 | 5/2003 |

OTHER PUBLICATIONS

Feb. 10, 2009 Search Report issued in International Search Report PCT/JP2008/070910 (with translation).
Robert Hoffman, Leo Gross, "Modulation Contrast Microscope," May 1975, pp. 1169-1176, vol. 14, No. 5, Applied Optics, USA.
Jan. 19, 2011 Supplementary European Search Report issued in European Application No. 08851334.6.

(Continued)

*Primary Examiner* — Frank Font
(74) *Attorney, Agent, or Firm* — Oliff & Berridge, PLC

(57) ABSTRACT

A modulation contrast microscope that affords good view of sperm in ICSI, in particular, good view during sperm manipulation in ICSI, by improving contrast of the end portion of the tail includes the modulation contrast microscope comprises an aperture member having a partial aperture disposed at or near the front focal plane of a condenser lens, and a modulator disposed at a plane substantially conjugate with the aperture member, at or near the rear focal plane of a first objective lens or a conjugate plane thereof. The transmittance T(%) of a region of the modulator, corresponding to the partial aperture, satisfies the condition 1 £ T £ 8. Good viewing for ICSI sperm manipulation can be obtained as a result.

8 Claims, 9 Drawing Sheets

(56) References Cited

OTHER PUBLICATIONS

Jan. 31, 2013 Office Action issued in Japanese Patent Application No. 2009-542550 (with English Translation).

May 10, 2013 Decision to Grant Patent issued in European Patent Application No. 2 214 045 A1.

Apr. 16, 2013 Office Action issued in Japanese Patent Application No. 2009-542550 (with English translation).

Jun. 24, 2011 Office Action issued in Chinese Patent Application No. 200880123124.1 (English version only).

May 3, 2012 Office Action issued in Chinese Patent Application No. 200880123124.1 (English version only).

Dec. 6, 2012 Office Action issued in Chinese Patent Application No. 200880123124.1 (English version only).

\* cited by examiner

TRANSMITTANCE T%

MODULATION CONTRAST MICROSCOPE

TECHNICAL FIELD

The present invention relates to a modulation contrast microscope, and more particularly, to a modulation contrast microscope that allows contrast to be enhanced.

BACKGROUND ART

So-called modulation contrast microscopy (Hoffman modulation contrast) is a known microscopy method disclosed in Patent document 1. Manufacturers build contrast microscopes on the basis of the principles disclosed in Patent document 1.

Patent document 2 discloses a modulation contrast microscope that is based on the principles of Patent document 1. The modulation contrast microscope comprises a light source, a condenser lens, an aperture disposed in the front focal position of the condenser lens, an objective lens, and a modulator disposed at a position substantially conjugate with the aperture and having a region of transmittance T(%), wherein the microscope is configured so as to satisfy the conditions of formula (1) and formula (2):

$$1.05 < |(Mo' \times fc)/(Mc' \times fr)| < 1.4 \quad (1)$$

$$8 < T < 25 \quad (2)$$

In formula (1) and formula (2), Mo' denotes the size, in the radial direction, of a region of transmittance T within a plane perpendicular to the optical axis in which the modulator is arranged, Mc' denotes the size of the aperture in the radial direction, centered around the microscope optical axis, fc is the focal distance of the condenser lens, and fr is the focal distance of the optical system from the surface of a specimen up to the modulator.

In addition to formula (1) and formula (2), Patent document 2 discloses also an instance where the microscope further satisfies the conditions of formula (3):

$$0.2R < D < 0.6R \quad (3)$$

In formula (3), R denotes the size of the effective radius of the plane at which the modulator is disposed, and D denotes the distance from the region of transmittance T from the microscope optical axis.

Patent document 1: Japanese Patent Application Laid-open No. 51-128548

Patent document 2: Japanese Patent Application Laid-open No. 2003-131139

As indicated in Patent document 2, so-called ICSI (intracytoplasmic sperm injection) has been used in recent years as an in-vitro fertilization technique for the treatment of infertility.

To inject a sperm into an egg cell, the normal procedure of ICSI often involves suctioning first a sperm from the tail of the latter. Sperm of good morphology must be selected, and it must be ensured that sperm are pipetted from the outmost end of the tail so as not to damage the sperm, in order to increase the fertilization success rate.

Under the modulation contrast microscopy conditions set forth in Patent document 1 and Patent document 2, however, contrast is weak for sperm, which in ICSI is as important as the egg. Contrast is weak, in particular, at the tail end of the sperm. The above methods are problematic in that, as a result, it is difficult to distinguish the tail end portion within the small form of sperm, and it is thus difficult to select sperm of good morphology, and to pipette sperm from the outmost end of the tail.

In particular, Patent document 2 sets forth "viewing is thus optimized, with good balance between resolution and contrast, but without excessive contrast, also in fine portions such as the zona pellucida and granules of the egg, by setting the partial aperture and the length of the region of transmittance T to lie within the range of formula (1) above". Patent document 2, however, does not set out any rationale for the transmittance T in formula (2), nor does it make any mention of contrast in sperm, in particular the tail.

DISCLOSURE OF THE INVENTION

In the light of the above, it is an object of the present invention to provide a modulation contrast microscope that affords good view of sperm in ICSI, in particular, good view during sperm manipulation in ICSI, by improving contrast of the end portion of the tail.

The modulation contrast microscope of the present invention is a modulation contrast microscope comprising an aperture member having a first partial aperture disposed at or near a front focal plane of a condenser lens, and a modulator disposed at a plane substantially conjugate with the aperture member, at or near a rear focal plane of an objective lens or a conjugate plane thereof, wherein the transmittance T(%) of a predetermined region of the modulator corresponding to the first partial aperture satisfies $1 \leq T \leq 8$.

More preferably, the transmittance T(%) of the predetermined region of the modulator corresponding to the first partial aperture satisfies $5 \leq T \leq 8$.

The microscope satisfies $1.0 \leq Mo/Mc \leq 1.3$, wherein Mc denotes the width of an image of the first partial aperture on the modulator, and Mo denotes the width of a predetermined region of the modulator having the transmittance T(%).

More preferably, the microscope satisfies $1.0 \leq Mo/Mc \leq 1.2$.

The aperture member further has a second partial aperture for adjusting contrast.

The present invention affords good view of sperm in ICSI, in particular, good view during sperm manipulation in ICSI, by improving contrast of the end portion of the tail.

Figure 1:
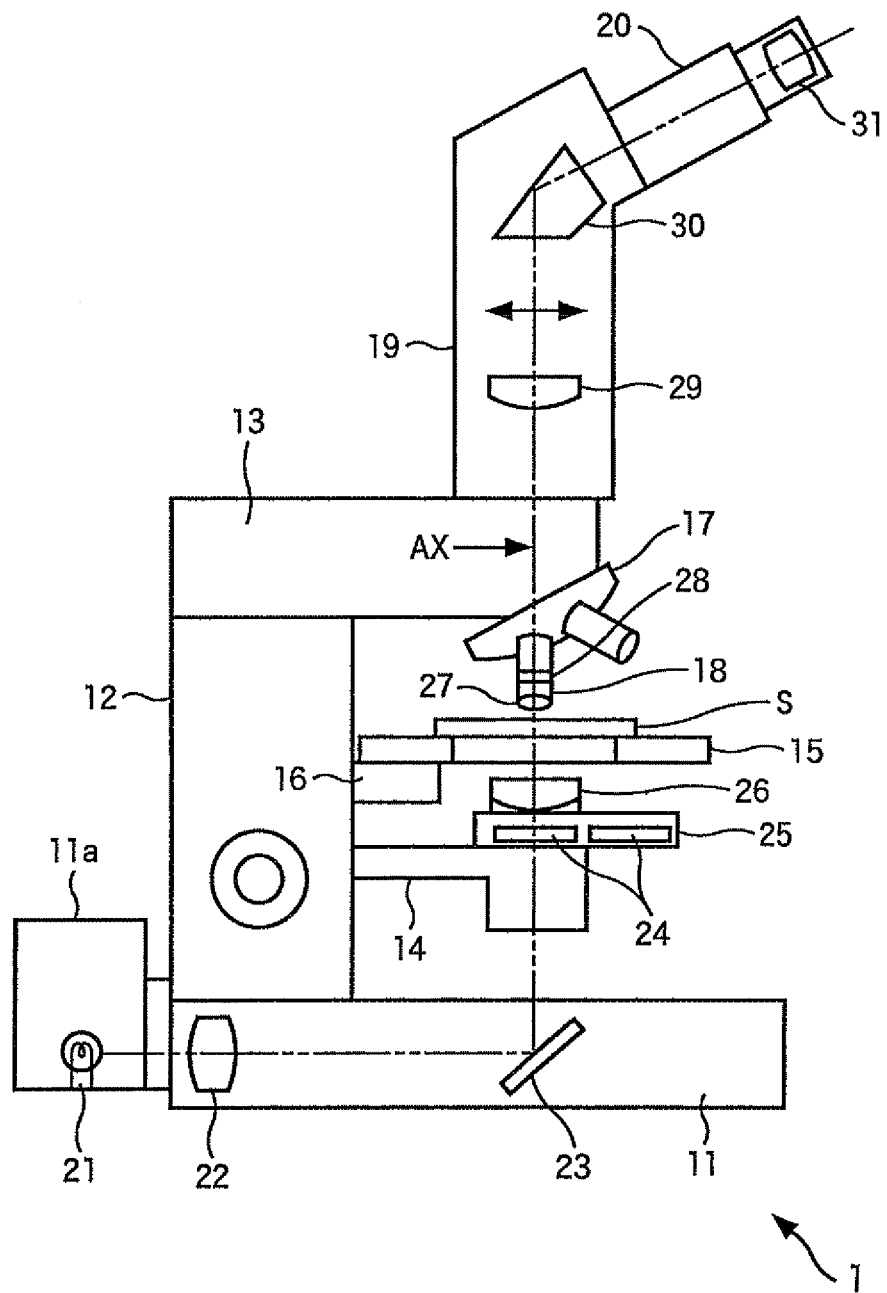
FIG. 1 is a schematic diagram illustrating the configuration of a modulation contrast microscope.

EXPLANATION OF REFERENCE NUMERALS 21 light source, 22 collector lens, 23 mirror, 24 aperture member, 24A and 249 partial aperture, 25 turret, 26 condenser lens, 27 first objective lens, 28 modulator, 28A region, 29 second objective lens, 30 prism, 31 eyepiece lens

BEST MODE FOR CARRYING OUT THE INVENTION

Embodiments of the present invention are explained below with reference to accompanying drawings.

FIG. 1 is a schematic diagram illustrating the configuration of a modulation contrast microscope.

In FIG. 1, a modulation contrast microscope 1 is an upright microscope for magnified observation of a sample S according to the principles of modulation contrast microscopy.

The modulation contrast microscope 1 comprises a stand 11, an upright base 12, an arm 13, an illumination lens unit 14, a sample stage 15, a stage driving unit 16, a revolver 17, an objective lens 18, an observation barrel 19 and an eyepiece lens barrel 20. The upright base 12 is upstandingly provided on the stand 11. The arm 13 extends horizontally at the top of the upright base 12. The broken line in the figure denotes an optical axis AX.

A light source section 11a is provided on the rear face (left side in the figure) of the stand 11. The illumination lens unit 14 and the stage driving unit 16 are fixed to the front face of the upright base 12. The stage driving unit 16 moves the sample stage 15, having the sample S set thereon, up and down in the direction of the optical axis AX, and holds the sample stage 15 in such a manner that the latter can rotate about the optical axis AX. The revolver 17, which inserts and removes the objective lens 18 to/from the optical path, is provided at the bottom of the leading end of the arm 13. The observation barrel 19 is provided at the top of the leading end of the arm 13. The eyepiece lens barrel 20 is provided at the leading end portion of the observation barrel 19.

The layout of the optical system along the optical path is explained next.

A light source 21 is housed in the light source section 11a. A collector lens 22, and a mirror 23 that reflects illumination light upwards, are housed inside the stand 11. Aperture members 24, a turret 25 and a condenser lens 26 are held in the illumination lens unit 14. Thus, rotation of the turret 25 allows selecting a desired aperture member 24 from among the plurality of aperture members 24 having dissimilar partial aperture sizes.

The objective lens 18 has a first objective lens 27 and a modulator 28. A second objective lens (image-forming lens) 29 and a prism 30 are disposed in the observation barrel 19. The prism 30 is disposed in such a manner that light reaching the prism 30 is split in two, whereupon one of the split beams is led to an eyepiece lens 31, and the other to an imaging device (not shown).

The optical system is configured thus as described above. The operation of the optical system is explained next with reference to FIGS. 2 to 4.

Figure 2:
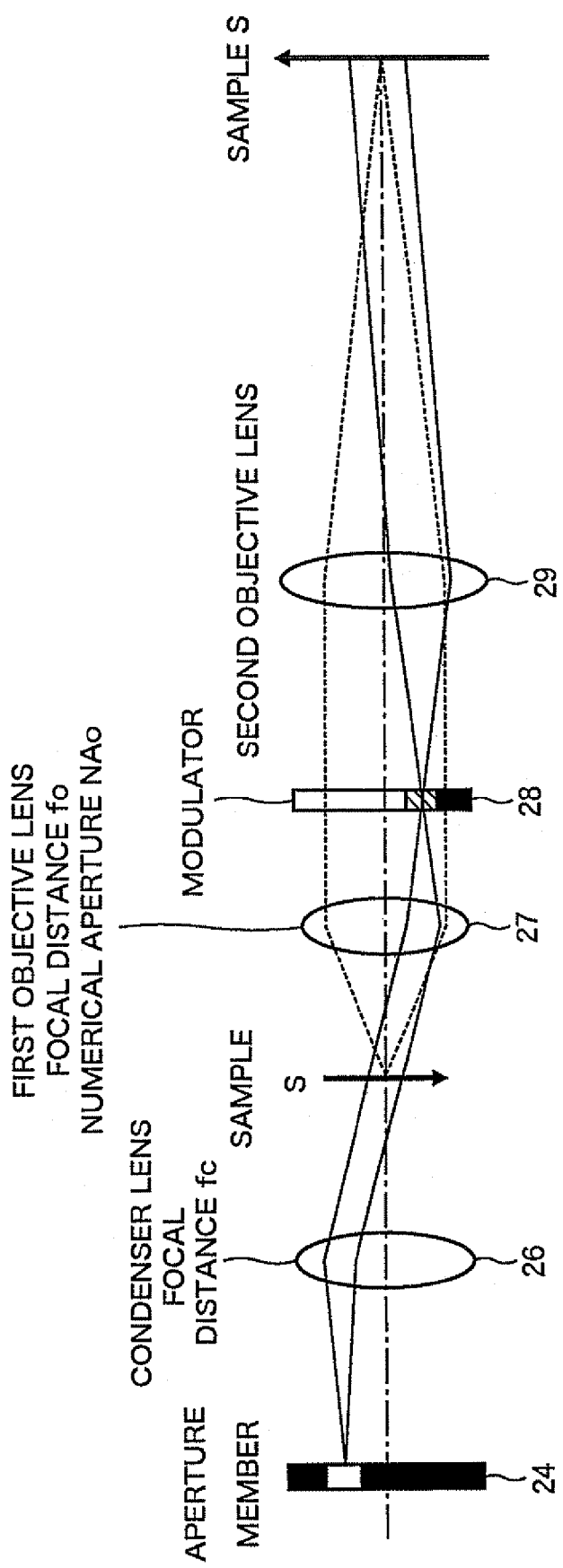
FIG. 2 is a schematic diagram of an optical system.
Figure 3:
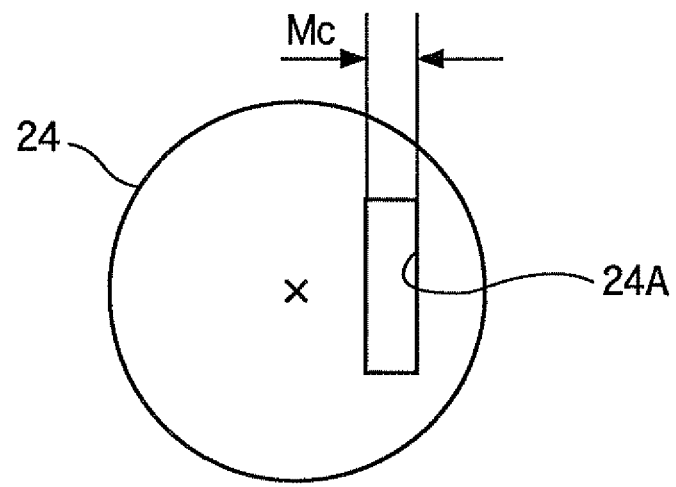
FIG. 3 is a diagram illustrating the details of an aperture member.

Illumination light emitted by the light source 21 is collimated by the collector lens 22, is reflected by the mirror 23, and strikes the aperture members 24, as illustrated in FIG. 2. The aperture member 24 is disposed at or near the front focal plane of the condenser lens 26 (focal distance fc). As illustrated in FIG. 3, the aperture member 24 has a rectangular partial aperture 24A disposed offset from the center of the aperture member 24 by a predetermined distance.

Returning now to FIG. 2, the illumination light, after having passed through the partial aperture 24A aperture member 24, is oriented towards the sample S by the condenser lens 26, and illuminates the sample S. The light emitted by the sample S upon being illuminated by the illumination light forms an image on the image plane by way of the first objective lens 27 (focal distance fo, aperture number NAo). The modulator 28 is disposed further towards the image plane than the first objective lens 27, at substantially the conjugate plane of the aperture member 24 (in FIG. 2, at or near the rear focal plane of the first objective lens 27).

Figure 4:
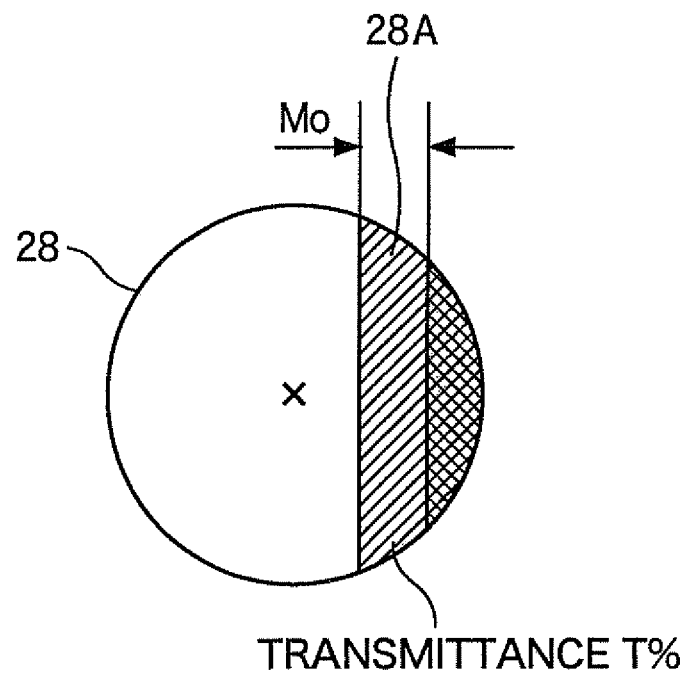
FIG. 4 is a diagram illustrating the details of a modulator.

As illustrated in FIG. 4, the modulator 28 has a predetermined region 28A where transmittance is T(%). The region 28A, like the rectangular partial aperture 24A illustrated in FIG. 3, is formed at a position offset from the center by a predetermined distance. Returning now to FIG. 2, the light that passes through the modulator 28 forms an image by way of the second objective lens 29, and strikes the eyepiece lens 31 via the prism 30.

As a result, for instance a contrast image of the irregular shape of the sample S can be observed when the sample image is examined through the eyepiece lens 31. Although not shown in the figures, the observation image may obviously be also captured by an imaging device such as a digital camera or the like, and the captured image may be displayed on a display device.

Figure 5:
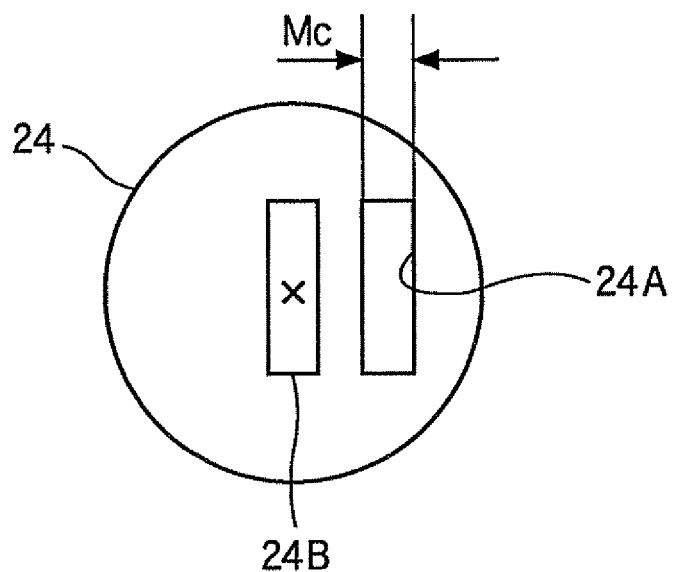
FIG. 5 is a diagram illustrating the details of an aperture member having a second partial aperture.

An example of the present embodiment has been explained in which the aperture member 24 has one partial aperture 24A, as illustrated in FIG. 3. However, the aperture member 24 may have, in addition to the first partial aperture 24A, also a second partial aperture 24B, as illustrated in FIG. 5. Specifically, the partial aperture 24B has for instance the same shape (rectangular) as the partial aperture 24A, and is disposed at a position spaced apart from the partial aperture 24A by a predetermined distance, as illustrated in FIG. 5. Contrast can be adjusted by further providing the partial aperture 24B and by controlling the transmittance of the partial aperture 24B.

The modulation contrast microscope 1 has thus the configuration described above.

In the present embodiment, when the modulation contrast microscope 1 having the above configuration is used in ICSI described above, the transmittance T(%) of the region 28A of the modulator 28 satisfies the conditions of formula (4).

$$1 \leq T \leq 8 \tag{4}$$

Satisfying the conditions of formula (4) allows increasing contrast of the tail portion of sperm vis-à-vis a conventional case, and allows suppressing the phenomenon of impaired observation due to excessive egg contrast, which is one problem in the conventional technology of the above-mentioned Patent document 2. Viewing with optimal contrast for ICSI can be achieved as a result.

The reasons for the enhanced contrast of sperm, in particular the end portion of the tail thereof, under the conditions of formula (4) derive from findings arrived at by the inventors of the present invention on the basis of detailed image formation simulations. The details of this simulation are explained next with reference to FIGS. 6 to 9.

The above simulation yields one-dimensional simulation images upon hypothetical observation of the three below-described samples using the modulation contrast microscope 1. Each sample is compared under four different conditions of transmittance T(%), namely T=10(%), 8(%), 5(%), 1(%).

The hypothetical samples observed were three types of (A) to (C) below.

(A) Spherical sample having $\phi=10$ μm, n=1.34: corresponds to a relatively large sample, such as an egg.

(B) Spherical sample having $\phi=1.5$ μm, n=1.35: corresponds to the root of the sperm's tail.

(C) Spherical sample having φ=0.5 μm, n=1.35: corresponds to the sperm's tail, comparatively towards the end thereof.

The actual size of an egg is about 80 μm, but for the sake of simulation there is calculated a sample having a size set to about 10 times that of sperm.

The simulation was performed under the simulation conditions (D) to (G) below.

Figure 7:
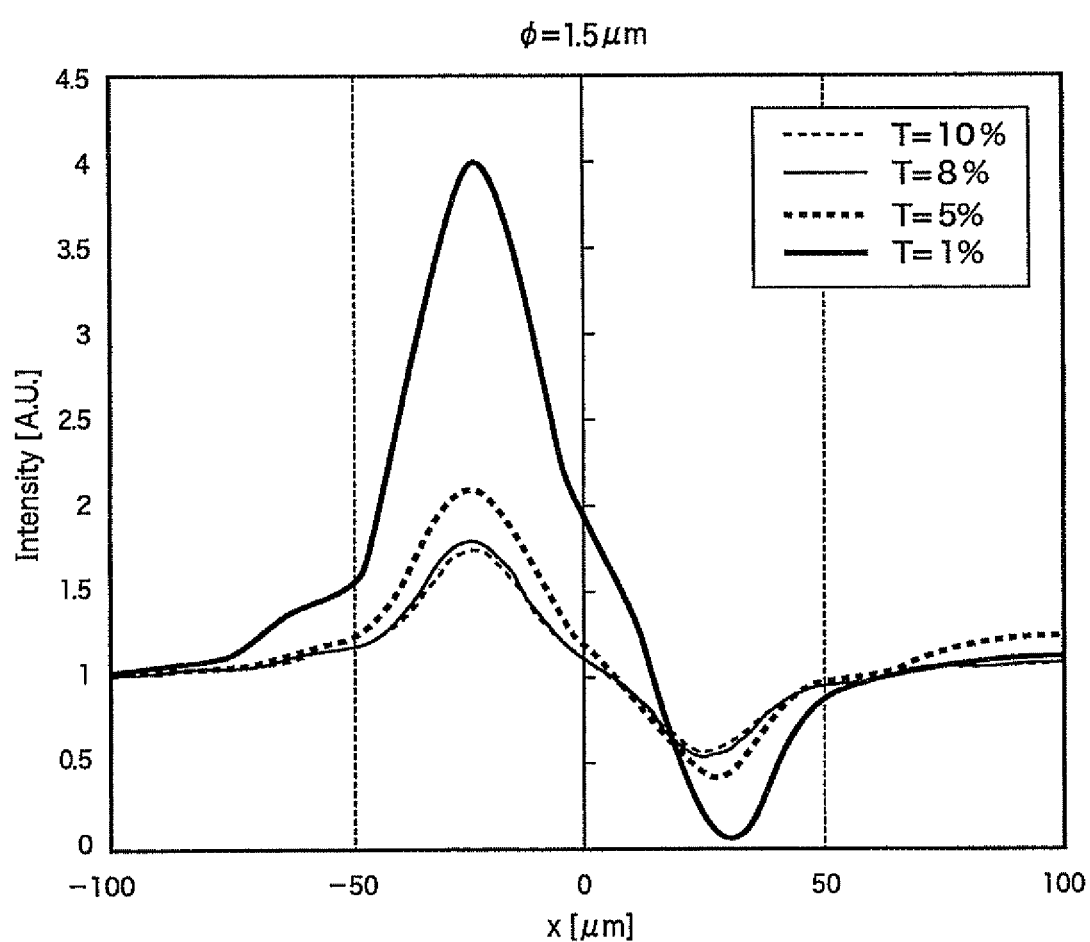
FIG. 7 is a graph representing a one-dimensional simulation image of a sample (B)
Figure 8:
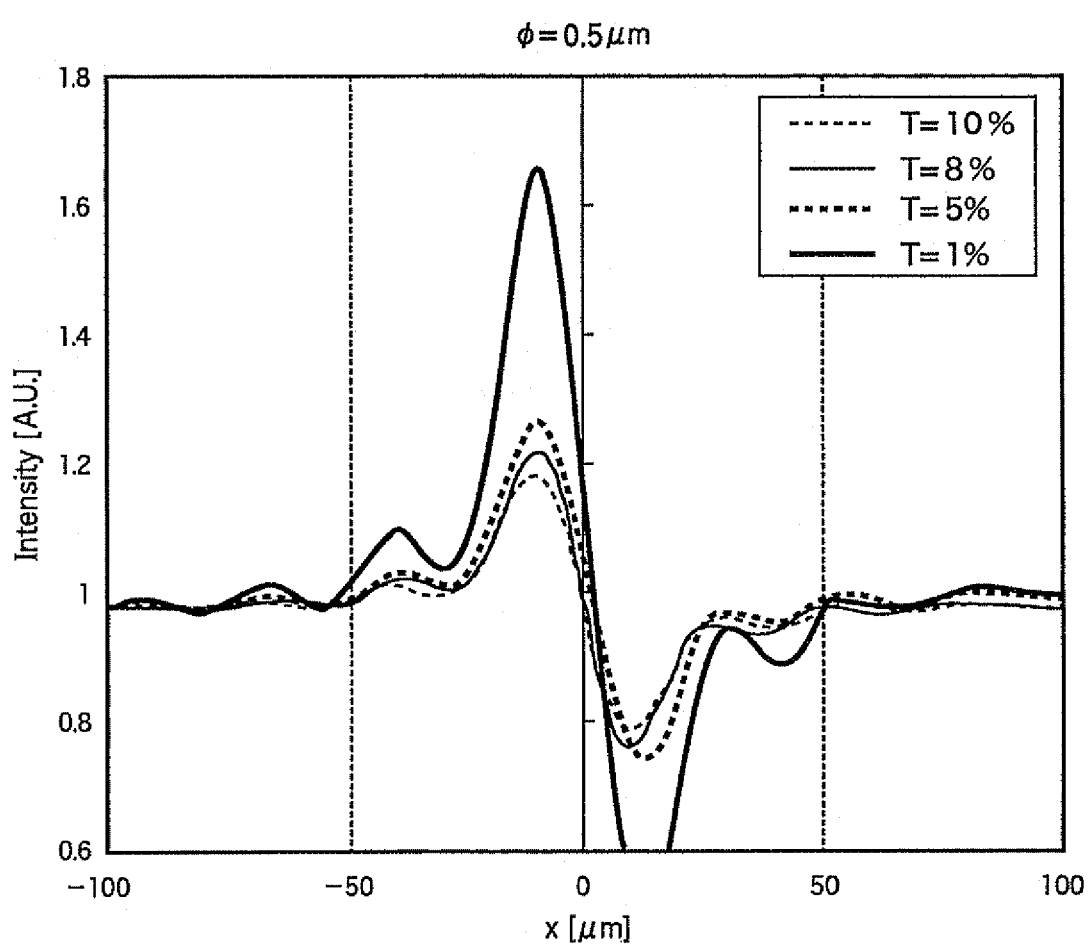
FIG. 8 is a graph representing a one-dimensional simulation image of a sample (C)

(D) Medium: water (n=1.33)
(E) Objective NA: 0.55 (ideal system)
(F) Slit width normalized by NA, with objective pupil diameter=1
(a) Mc=0.275 (width of the partial aperture 24A, in the radial direction centered around the microscope optical axis, projected on the modulator 28); Mo=0.31 (size, in the radial direction, of the region having transmittance T within a plane perpendicular to the optical axis in which the modulator 28 is disposed)
(b) Value of formula (7) or formula (8) (explained in detail further on): Mo/Mc=0.31/0.275=1.13
(c) Value of formula (9) (explained in detail further on): D=0.49R
(G) Wavelength λ=588 nm FIGS. 6 to 8 show one-dimensional simulation images obtained through simulation performed on the above samples under the conditions set forth above.

Figure 6:
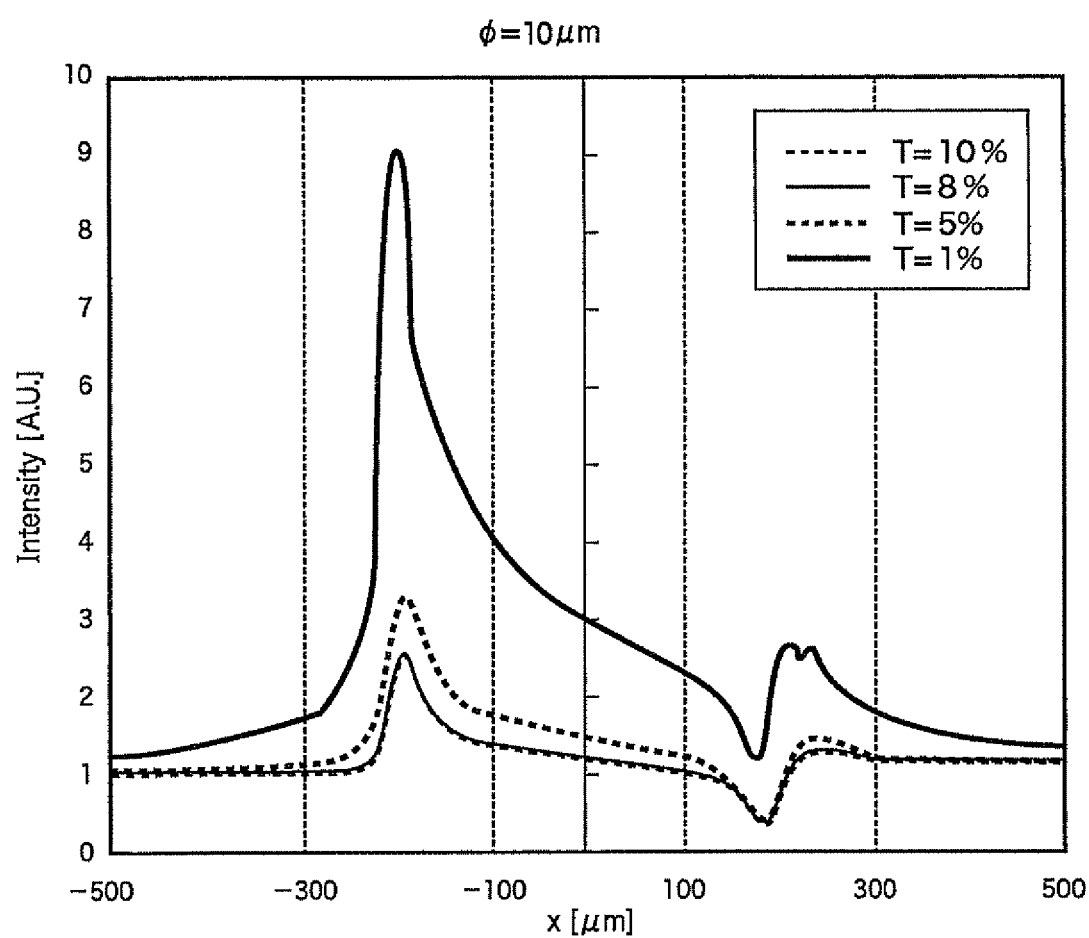
FIG. 6 is a graph representing a one-dimensional simulation image of a sample (A)

FIG. 6 is a graph representing a one-dimensional simulation image of sample (A).

In FIG. 6, the Intensity (A.U.) in the vertical axis represents relative brightness, and the horizontal axis represents x (μm). In FIG. 6, the thin solid line is a graph of transmittance T=8(%), and the thin broken line is a graph of transmittance T=10(%). The thick solid line is a graph of transmittance T=1(%), and the thick broken line is a graph of transmittance T=5(%). These relationships are the same in the other graphs described below.

To compare the view of each sample at each transmittance T, there are compared contrast values that are determined for each transmittance T and for each sample (in the example here, transmittance T=8(%) and transmittance T=10(%)). The method used for determining the contrast value may be, for instance, Michelson contrast, in which the contrast value is calculated on the basis of maximum and minimum brightness values. The method for determining the contrast value is not particularly limited to the above, and any other method may be employed.

In FIG. 6, the contrast values determined for each transmittance T on the basis of the two graphs represented by the thin solid and broken lines are as follows. Contrast value of sample (A) is 0.78 at transmittance T=8(%), and 0.72 at transmittance T=10(%).

Similarly, the contrast value determined on the basis of the graphs in the one-dimensional simulation image of sample (B) of FIG. 7 is 0.61, at transmittance T=8(%) and 0.55 at transmittance T=10(%).

Further, the contrast value determined on the basis of the graphs in the one-dimensional simulation image of sample (C) of FIG. 8 is 0.20, at transmittance T=8(%) and 0.18 at transmittance T=10(%).

The above results indicate clearly that contrast is increased to a greater degree at transmittance T=8(%) than for transmittance T=10(%).

Figure 9A:
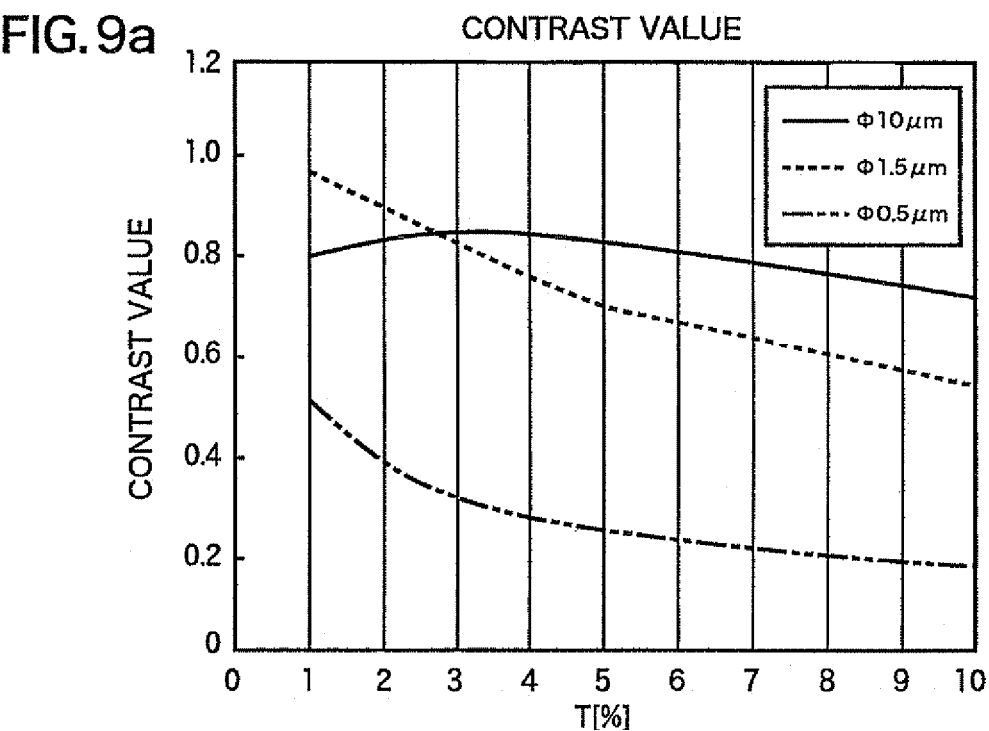
FIG. 9 is a graph representing the relationship between contrast value and various values of transmittance T.
Figure 9B:
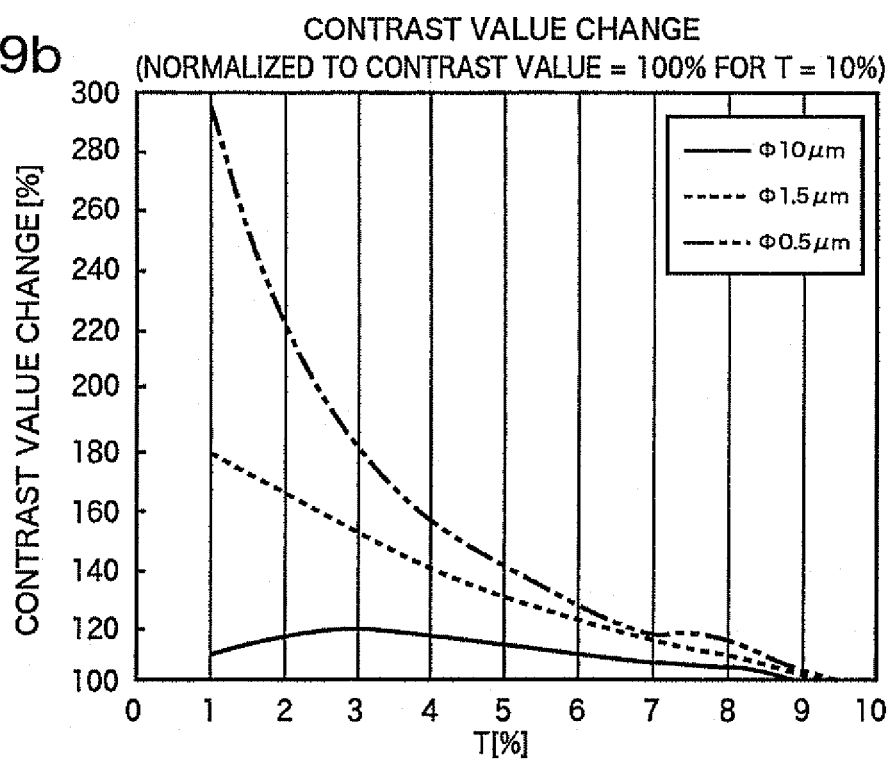

The graphs in FIG. 9a and FIG. 9b summarize the simulation results in the above sample (A) to sample (C). Specifically, FIG. 9a is a graph illustrating the contrast value for various values of transmittance T, on the basis of the graphs of FIGS. 6 to 8, and FIG. 9b depicts a comparison between the graph of various values of transmittance T(%) in the graphs of FIGS. 6 to 8, and a graph for transmittance T=10(%). That is, FIG. 9b illustrates a calculated value (hereafter, contrast increase rate) as the percentage of contrast values, for each transmittance T, with respect to transmittance T=10(%).

For instance, as illustrated in FIG. 9a, the contrast value for φ=10 μm (sample (A)) is 0.72 when transmittance=10(%), and is 0.78 when transmittance T=8(%). Therefore, the contrast increase rate for φ=10 μm is 107(%), as illustrated in FIG. 9b.

Similarly, the contrast value for φ=1.5 μm (sample (B)) is 0.55 when transmittance=10(%), and is 0.61 when transmittance T=8(%). Therefore, the contrast increase rate for φ=1.5 μm is 111(%).

Similarly, the contrast value for φ=0.5 μm (sample (C)) is 0.18 when transmittance=10(%), and is 0.20 when transmittance T=8(%). Therefore, the contrast increase rate for φ=0.5 μm is 117(%).

The above results indicate that the finer the structure is, the more distinctive the increase in contrast becomes. In particular, contrast increases by 17(%) for φ=0.5 μm, which corresponds to the end of the sperm tail. Ordinarily, the above effect becomes visually appreciable when the contrast increase rate exceeds 10(%).

The above results indicate that the finer the structure is, the more distinctive the increase in contrast becomes. In particular, contrast increases by 10% or more for φ=0.5 μm, which corresponds to the dimensions of a sperm's tail end. Ordinarily, contrast increase becomes visually appreciable when the contrast increase rate exceeds 10(%). The ease with which sperm tails are appreciated visually is thus significantly enhanced.

The above results indicate that keeping transmittance no greater than T=8(%), allows increasing preferentially the contrast of structures such as a sperm's tail, but without significantly altering the contrast of large structures, such as an egg, that intrinsically exhibit high contrast. As a result, this affords good view of sperm in ICSI, in particular, good view during sperm manipulation in ICSI, by improving contrast of the end portion of the tail.

According to FIG. 9a and FIG. 9b, contrast in images of structures such as sperm that are finer than egg cells increases as transmittance T becomes lower. When transmittance T is lowered to T=0%, i.e. a state where no light is transmitted at all, then all zero-order light (direct light) that passes through the sample is blocked by modulator, and fails to reach the image plane. As a result, the image obtained at the image plane is not the relief-like contrast image intended by the present invention, but an image the view whereof is similar to that of so-called dark field illumination. Therefore, the lower the transmittance T is set in the present invention, to T=8% and lower, the higher the contrast that can be achieved in a phase object having a fine structure, such as the tail of a sperm. However, a state in which transmittance T is effectively 0% is forbidden. The theoretical lower limit value of transmittance T is therefore T>0%. In terms of component cost and to facilitate manufacturing, an ND (Neutral Density) film, which relies on absorption and reflection, is used in practice for realizing the transmittance T. The ordinary manufacturing error in such ND films is required to lie within about T=±1%. Such being the case, the lower limit of transmittance T can be regarded as T=1%, with manufacturing limitations in mind.

In FIG. 9a, the vertical axis of the one-dimensional simulation image, namely the image intensity, is rendered normalized in such a manner that the intensity of background light, i.e. the intensity of light at portions of no phase change, is 1.

Apparently, therefore, the lower the transmittance T the better the latter is. In practice, however, the absolute-value intensity of background light is proportional to the transmittance T. Hence, the background light intensity in a case where, for instance, transmittance T=1%, is 1/10 of a case where transmittance T=10%, so that only a very dark image can be obtained. The object of the present invention is to provide a microscope device suitable for ICSI. However, using 1/10 of the current background light, i.e. 1/10 of the current image brightness would preclude achieving sufficient grayscale differences in an actual microscope device, and would result in unacceptably dark visual observation. For the above reasons, and in terms of enhancing the efficiency of the visual observation operation, the transmittance ranges preferably from T=5% to 8%.

In the present example, the contrast of fine-structure samples, such as sperm tails, is selectively enhanced by setting the transmittance T(%) to a lower value than in Patent document 2 described above. In modulation contrast microscopy, however, contrast is also determined by other parameters, apart from transmittance T. Therefore, these other factors are preferably also taken into account in order to realize yet more effectively contrast enhancement in the present embodiment. An explanation follows next, thus, on factors for increasing contrast other than the above-described formula (4).

Figure 10:
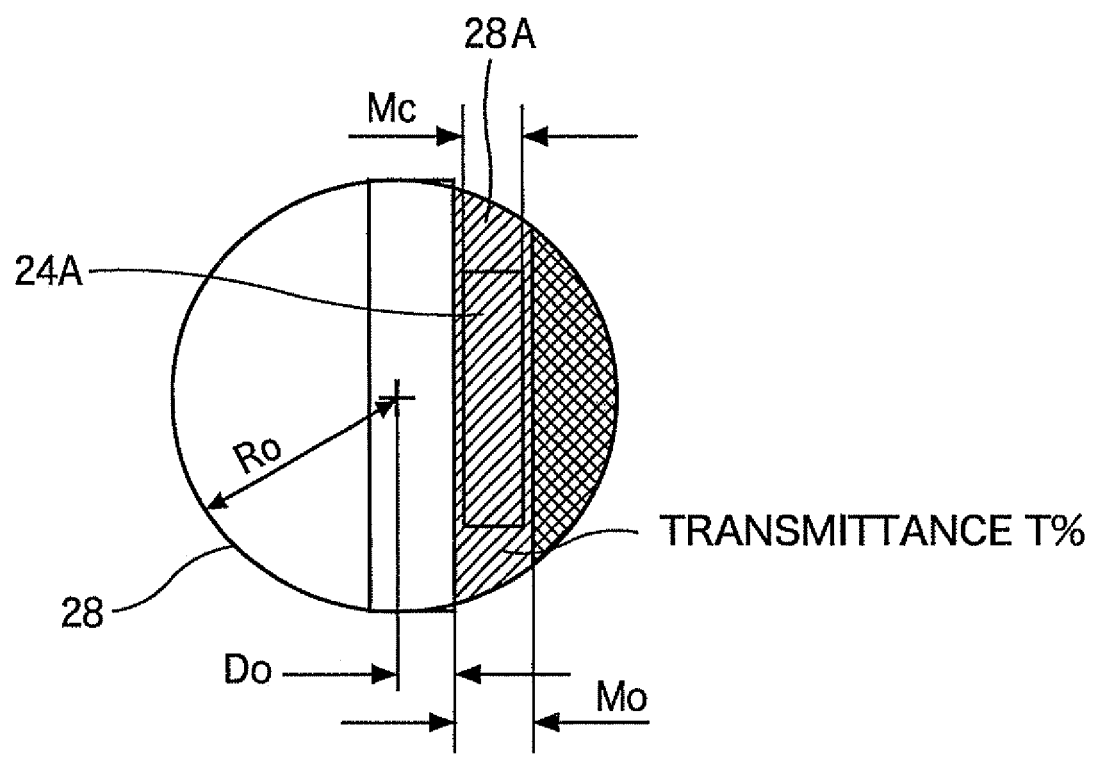
FIG. 10 is a schematic diagram illustrating projections of the aperture member and the modulator on the rear focal plane of an objective lens.

FIG. 10 illustrates the relationship between an image by the first objective lens 27 and the condenser lens 26 for the partial aperture 24A of the aperture member 24 of FIG. 3, and the position of the region 28A of the modulator 28 of FIG. 4. That is, FIG. 10 depicts the projection of the modulator 28 and the partial aperture 24A of the aperture member 24 on the rear focal plane (or conjugate plane thereof) of the first objective lens 27.

The effective radius Ro of the rear focal plane of the first objective lens 27 is given by the focal distance fo of the first objective lens 27 and the aperture number NAo of the first objective lens 27, according to formula (5) below.

$$Ro=fo \times NAo \quad (5)$$

As illustrated in FIG. 10, Mc denotes the width of the partial aperture 24A on the above-described projection plane, and Mo denotes the width of the region 28A of the modulator 28 having transmittance T(%). Further, Do denotes the distance from the center of the rear focal plane of the first objective lens 27 up to the inner side end of the region 28A having transmittance T(%). Assuming the partial aperture 24A to be disposed at the front focus of the condenser lens 26 and the modulator 28 to be disposed at the rear focus of the first objective lens 27, as explained for FIG. 2, and assuming all lenses to be aplanatic (ideal optical system), then the actual dimension Mc' of the partial aperture 24A in the condenser lens 26 is given by Mc according to formula (6) below.

$$Mc'=fc/fo \times Mc \quad (6)$$

In modulation contrast microscopy, as explained above, contrast is determined by other parameters, in addition to transmittance T. Therefore, these other factors must also taken into account in order to realize yet more effectively contrast enhancement. Parameters that influence contrast include, for instance, the ratio between the width Mc of the partial aperture 24A of the aperture member 24 and the width Mo of the region 28A of the modulator 28, as well as the eccentricity of the modulator 28.

As regards the width of the partial aperture 24A and the region 28A, the principles of modulation contrast microscopy mandate that Mc be no greater than Mo. Therefore, Mc is ordinarily prescribed to be smaller than Mo, in terms of aberration and manufacturing error. However, contrast decreases as the width Mc of the image of the partial aperture 24A becomes smaller than the width Mo of the region 28A, which is problematic. Also, the amount of background light during observation decreases, and the image becomes darker, as the width Mc of the image of the partial aperture 24A becomes smaller, which is likewise problematic. Accordingly, Mc is preferably set in the present embodiment to be within the range of Mo and to have a value as close as possible to that of Mo, with a view to, in particular, preserving contrast and securing the amount of light.

In the present embodiment, therefore, the width Mc of the image of the partial aperture 24A and the width Mo of the region 28A preferably satisfy the relationship of formula (7) below.

$$1.0 \leq Mo/Mc \leq 1.3 \quad (7)$$

More preferably, the relationship of formula (8) below is satisfied, in order for the drop in contrast to be almost inappreciable visually.

$$1.0 \leq Mo/Mc \leq 1.2 \quad (8)$$

To secure good contrast according to the principles of modulation contrast microscopy, moreover, Do and Ro satisfy preferably the relationship of formula (9) below, which holds also in the present embodiment.

$$0.2R < Do/Ro < 0.6R \quad (9)$$

In formula (9), R denotes the size of the effective radius of the plane at which the modulator 28 is disposed.

In the present embodiment, thus, better contrast is secured by satisfying, in addition to the conditions of formula (4), also the relationship of formula (7) or formula (8), while resolving power is enhanced by satisfying the relationship of formula (9). Good viewing upon sperm manipulation in ICSI can be achieved as a result.

The modulation contrast microscope 1 in the explanation of the present embodiment is an upright microscope, but may also be an inverted microscope.

Also, the position at which the modulator 28 is disposed is not limited to the rear focal plane of the first objective lens 27. In a case where a relay optical system is disposed between the eyepiece lens 31 and the second objective lens 29 of FIG. 2, the modulator 28 may be disposed for instance at or near the conjugate plane of the rear focal plane of the second objective lens 29 formed by the relay optical system.

The embodiments of the present invention are not limited to the above-described ones, and various modifications can be made to the embodiments without departing from the scope of the present invention.

The invention claimed is:

1. A modulation contrast microscope comprising:
a condenser lens,
an aperture member having a first partial aperture disposed at or near a front focal plane of the condenser lens,
the first partial aperture being a partial aperture disposed offset from a center of the aperture member by a predetermined distance,
a modulator disposed at a plane substantially conjugate with said aperture member, at or near a rear focal plane of an objective lens or a conjugate plane thereof,
wherein a transmittance T(%) of a predetermined region of said modulator corresponding to said first partial aperture satisfies $1 \leq T \leq 8$, the predetermined region of the modulator corresponding to the first partial aperture being formed at a position offset from a center of the modulator by a predetermined distance.

2. The modulation contrast microscope according to claim 1, wherein the transmittance T(%) of the predetermined region corresponding to said first partial aperture satisfies 5≤T≤8.

3. The modulation contrast microscope according to claim 1, wherein the microscope satisfies 1.0≤Mo/Mc ≤1.3, where Mc denotes the width of an image of said first partial aperture on said modulator, and Mo denotes the width of a predetermined region of said modulator having the transmittance T(%).

4. The modulation contrast microscope according to claim 1, wherein the microscope satisfies 1.0≤Mo/Mc≤1.2, where Mc denotes the width of an image of said first partial aperture on said modulator, and Mo denotes the width of a predetermined region of said modulator having the transmittance T(%).

5. The modulation contrast microscope according to claim 1, wherein said aperture member further has a second partial aperture for adjusting contrast.

6. The modulation contrast microscope according to claim 2, wherein the microscope satisfies 1.0≤Mo/Mc≤1.3, where Mc denotes the width of an image of said first partial aperture on said modulator, and Mo denotes the width of a predetermined region of said modulator having the transmittance T(%).

7. The modulation contrast microscope according to claim 2, wherein the microscope satisfies 1.0≤Mo/Mc≤1.2, where Mc denotes the width of an image of said first partial aperture on said modulator, and Mo denotes the width of a predetermined region of said modulator having the transmittance T(%).

8. The modulation contrast microscope according to claim 2, wherein said aperture member further has a second partial aperture for adjusting contrast.

* * * * *